US008119042B2

United States Patent
Ganschow et al.

(10) Patent No.: US 8,119,042 B2
(45) Date of Patent: Feb. 21, 2012

(54) DIKETOPYRROLOPYRROLE COCRYSTALS

(75) Inventors: Matthias Ganschow, Wiesbaden (DE); Uwe Benner, Hattersheim (DE); Sascha Steinhauer, Selters (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 12/678,665

(22) PCT Filed: Sep. 24, 2008

(86) PCT No.: PCT/EP2008/008073
§ 371 (c)(1),
(2), (4) Date: Mar. 17, 2010

(87) PCT Pub. No.: WO2009/052917
PCT Pub. Date: Apr. 30, 2009

(65) Prior Publication Data
US 2010/0213421 A1 Aug. 26, 2010

(30) Foreign Application Priority Data
Oct. 18, 2007 (DE) .......................... 10 2007 049 883

(51) Int. Cl.
G02B 5/23 (2006.01)
C08K 5/00 (2006.01)
C09D 11/00 (2006.01)
C07D 243/08 (2006.01)
G03G 9/00 (2006.01)

(52) U.S. Cl. ..................... 252/586; 106/31.6; 106/31.72; 106/498; 430/108.21; 524/92

(58) Field of Classification Search .................. 252/586, 252/582; 106/31.6, 31.72, 498, 31.65, 494; 430/108.21; 548/453; 524/92, 597, 720
See application file for complete search history.

(56) References Cited

U.S. PATENT DOCUMENTS

| 4,579,949 A | 4/1986 | Rochat et al. |
| 4,720,305 A | 1/1988 | Iqbal et al. |
| 5,354,869 A * | 10/1994 | Langhals et al. ............. 548/453 |
| 5,476,949 A * | 12/1995 | Wallquist et al. ............ 548/453 |
| 5,693,824 A | 12/1997 | Mizuguchi et al. |
| 5,708,188 A | 1/1998 | Hao et al. |
| 5,808,094 A | 9/1998 | Mizuguchi et al. |
| 5,976,238 A | 11/1999 | Erkens et al. |
| 6,469,147 B2 | 10/2002 | Nickel et al. |
| 7,135,266 B2 | 11/2006 | Baur et al. |
| 2001/0029294 A1 | 10/2001 | Nickel et al. |
| 2003/0083410 A1 | 5/2003 | Baur et al. |
| 2010/0119966 A1 * | 5/2010 | Ganschow ............ 430/108.21 |
| 2010/0219384 A1 * | 9/2010 | Reipen et al. ................. 252/582 |

FOREIGN PATENT DOCUMENTS

| CH | EP0794235 A1 * | 2/1997 |
| EP | 0094911 | 9/1982 |
| EP | 0181290 | 5/1986 |
| EP | 0640603 | 3/1995 |
| EP | 0704497 | 4/1996 |
| EP | 0764696 | 3/1997 |
| EP | 0816440 | 1/1998 |
| EP | 0962499 | 12/1999 |
| EP | 1257602 | 8/2001 |
| WO | WO02085987 A1 * | 10/2002 |

OTHER PUBLICATIONS

PCT International Search Report for PCT/EP 2008/008073 mailed Feb. 18, 2009.
Engish Translation of International Preliminary Report on Patentability for PCT/EP 2008/008073, mailed May 20, 2010.

* cited by examiner

*Primary Examiner* — Ling Choi
*Assistant Examiner* — Bijan Ahvazi
(74) *Attorney, Agent, or Firm* — Anthony A. Bisulca

(57) ABSTRACT

The invention relates to cocrystals of compounds of the formulae (I), (II) and (III), obtainable by reacting 1 mol of a succinic diester with 2 mol of a mixture of nitriles A-CN and B—CN, where A-CN and B—CN are present in the nitrile mixture in a molar ratio of 90:10 to 30:70 relative to one another, and where A-CN is 2-chlorobenzonitrile and B—CN is 4-X-benzonitrile where X=chlorine, methyl or nitrile.

9 Claims, No Drawings

DIKETOPYRROLOPYRROLE COCRYSTALS

The present invention relates to novel diketopyrrolopyrrole mixed crystals.

Diketopyrrolopyrrole pigments are notable for very high fastnesses in coatings and plastics. The sole commercially available ruby-red diketopyrrolopyrrole pigment is C.I. Pigment Red 264, which is very costly to manufacture.

It is an object of the present invention to provide a ruby-red diketopyrrolopyrrole pigment that has high fastnesses, high cleanness of hue and brilliance and is less costly than P.R. 264.

Pure bis(2-chlorophenyl)diketopyrrolopyrrole (III) has orange coloristics and pure bis(4-chlorophenyl)diketopyrrolopyrrole ((I) where X=Cl has yellowish red coloristics.

EP-A-0 094 911, WO 2002/085 987 and EP-A-0 181 290 disclose DPP pigment compositions prepared by mixed synthesis from two different nitriles A and B and succinic diesters. Mixed syntheses from 2- and 4-chlorobenzonitriles are not described.

EP-A-0 962 499 discloses diketopyrrolopyrrole pigment compositions (DPPs) prepared by mixed synthesis from two different nitriles A and B and succinic diesters in the presence of a crystal growth inhibitor. Mixed syntheses from 2- and 4-chlorobenzonitriles are not described.

We have found that, surprisingly, a mixed crystal comprising a certain quantitative ratio of bis(4-X-phenyl)diketopyrrolopyrrole (I), (2-chlorophenyl)-(4-X-phenyl)diketopyrrolopyrrole (II) and bis(2-chlorophenyl)diketopyrrolopyrrole (III) has ruby-red coloristics and also a high cleanness of hue and brilliance.

The present invention accordingly provides a mixed crystal comprising compounds of formula (I), (II) and (III),

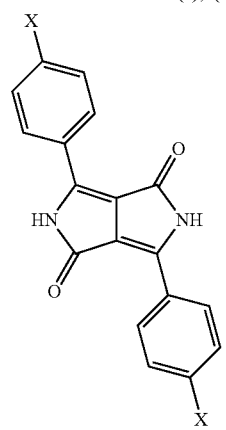

(I)

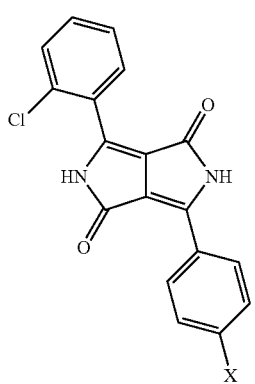

(II)

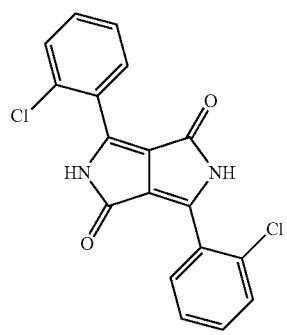

(III)

obtainable by reacting 1 mol of a succinic diester with 2 mol of a mixture of nitriles A-CN and B-CN, in a molar ratio of 90:10 to 30:70, preferably 80:20 to 40:60, in particular 75:25 to 50:50, between the A-CN and B-CN in the nitrile mixture, A-CN being 2-chlorobenzonitrile and B-CN being 4-X-benzonitrile where X=chlorine, methyl or nitrile.

Preferably, X is chlorine.

We have further found that, surprisingly, the mixed crystals of the present invention have a previously unknown crystal form.

As used herein, the term "mixed crystal" is to be understood as including the meaning of "solid solutions". The properties of mixed crystals differ not only from the properties of the individual components but also from the properties of the physical mixtures of the individual components. More particularly, the x-ray powder diagrams of mixed crystals differ from those of the corresponding physical mixtures and from the sum total of the powder diagrams of the individual compounds.

The crystal form of the present invention is characterized by the following main signals (intensities: s=strong and m=medium) in the x-ray powder diagram (Cu—$K_\alpha$ radiation, 2 theta values in degrees, measuring accuracy +/−0.2°):

| 2 theta: | relative intensity: |
|---|---|
| 5.9 | s |
| 13.4 | m |
| 15.8 | m |
| 25.5 | m |
| 26.5 | m |

The present invention also provides a process for preparing the mixed crystals of the present invention by reacting succinic diesters with 2-chloro- and 4-X-benzonitrile in the abovementioned proportions, in an organic solvent, in the presence of a strong base and at elevated temperature to form a pigment alkali salt, subsequent hydrolysis of the pigment alkali salt in water and/or alcohol and optionally subsequent solvent finishing.

The overall concentration of nitriles in the organic solvent is advantageously 0.5 to 5 mol/l.

The molar ratio of strong base to succinic diester is advantageously 0.1 to 10 mol of base per 1 mol of succinic diesters.

The reaction temperature for forming the pigment alkali salt is advantageously 60 to 140° C., preferably 80 to 120° C.

The succinic diesters to be used can be dialkyl, diaryl or monoalkyl monoaryl esters, and the dialkyl and diaryl succinate esters may also be asymmetrical. Preference is given to symmetrical succinic diesters, in particular symmetrical dialkyl succinate esters. Aryl in a diaryl succinate or monoaryl monoalkyl succinate, is in particular phenyl which is unsubstituted or substituted by 1, 2 or 3 substituents selected from the group consisting of halogen, such as chlorine, $C_1$-$C_6$-alkyl, such as methyl, ethyl, isopropyl, tert-butyl or tert-amyl, and $C_1$-$C_6$-alkoxy, such as methoxy or ethoxy. Aryl is preferably unsubstituted phenyl. Alkyl in a dialkyl succinate or monoalkyl monoaryl succinate can be unbranched, branched or cyclic, preferably branched, and preferably contain 1 to 18, in particular 1 to 12, especially 1 to 8 and more preferably 1 to 5 carbon atoms. Alkyl is preferably secondary or tertiary alkyl, for example isopropyl, sec-butyl, tert-butyl, tert-amyl, cyclohexyl, heptyl, 2,2-dimethylhexyl, octyl, decyl, dodecyl, tetradecyl or octadecyl.

Examples of succinic diesters are dimethyl succinate, diethyl succinate, dipropyl succinate, dibutyl succinate, dipentyl succinate, dihexyl succinate, diheptyl succinate, dioctyl succinate, diisopropyl succinate, di-sec-butyl succinate, di-tert-butyl succinate, di-tert-amyl succinate, di-[1,1-dimethylbutyl] succinate, di-[1,1,3,3-tetramethylbutyl] succinate, di-[1,1-dimethylpentyl] succinate, di-[1-methyl-1-ethylbutyl] succinate, di-[1,1-diethylpropyl] succinate, diphenyl succinate, di-[4-methylphenyl] succinate, di-[2-methylphenyl] succinate, di-[4-chlorophenyl] succinate, di[2,4-dichlorophenyl] succinate, monoethyl monophenyl succinate, dicyclohexyl succinate.

Symmetrical dialkyl succinates wherein alkyl is branched and contains 3 to 5 carbon atoms are used in particular.

The reaction of the succinic diester with the nitrile is carried out in an organic solvent. Examples of suitable solvents are primary, secondary or tertiary alcohols having 1 to 10 carbon atoms, such as methanol, ethanol, n-propanol, isopropanol, n-butanol, sec-butanol, tert-butanol, pentanols, such as n-pentanol or 2-methyl-2-butanol, hexanols, such as 2-methyl-2-pentanol or 3-methyl-3-pentanol, 2-methyl-2-hexanol, 3-ethyl-3-pentanol, octanols, such as 2,4,4-trimethyl-2-pentanol, cyclohexanol, or glycols, such as ethylene glycol, diethylene glycol, propylene glycol, dipropylene glycol or glycerol, or polyglycols, such as polyethylene glycols or polypropylene glycols, ethers, such as methyl isobutyl ether, tetrahydrofuran, dimethoxyethane or dioxane, glycol ethers, such as monomethyl or monoethyl ethers of ethylene glycol or of propylene glycol, diethylene glycol monomethyl ether or diethylene glycol monoethyl ether, butyl glycols or methoxybutanol, dipolar aprotic solvents, for example acid amides such as dimethylformamide, N,N-dimethylacetamide or N-methylpyrrolidone, urea derivatives such as tetramethylurea, aliphatic or aromatic hydrocarbons, such as cyclohexane or benzene or alkyl-, alkoxy-, nitro- or halogen-substituted benzene, such as toluene, xylenes, ethylbenzene, anisole, nitrobenzene, chlorobenzene, o-dichlorobenzene or 1,2,4-trichlorobenzene, aromatic N-heterocycles, such as pyridine, picoline or quinoline, and also hexamethylphosphoramide, 1,3-dimethyl-2-imidazolidinone, dimethyl sulfoxide or sulfolane.

The pigment alkali metal salt is prepared in the presence of a strong base. Suitable strong bases are in particular the alkali metal salts themselves, such as lithium, sodium or potassium, or alkali metal amides, such as lithium-, sodium- or potassium amide, or alkali metal hydrides, such as lithium, sodium or potassium hydride, or alkaline earth metal or alkali metal alkoxides derived in particular from primary, secondary or tertiary aliphatic alcohols having 1 to 10 carbon atoms, such as for example lithium methoxide, sodium methoxide, potassium methoxide, lithium ethoxide, sodium ethoxide, potassium ethoxide, lithium n-propoxide, sodium n-propoxide, potassium n-propoxide, lithium isopropoxide, sodium isopropoxide, potassium isopropoxide, lithium n-butoxide, sodium n-butoxide, potassium n-butoxide, lithium sec-butoxide, sodium sec-butoxide, potassium sec-butoxide, lithium tert-butoxide, sodium tert-butoxide, potassium tert-butoxide, lithium 2-methyl-2-butoxide, sodium 2-methyl-2-butoxide, potassium 2-methyl-2-butoxide, lithium 2-methyl-2-pentoxide, sodium 2-methyl-2-pentoxide, potassium 2-methyl-2-pentoxide, lithium 3-methyl-3-pentoxide, sodium 3-methyl-3-pentoxide, potassium 3-methyl-3-pentoxide, lithium 3-ethyl-3-pentoxide, sodium 3-ethyl-3-pentoxide or potassium 3-ethyl-3-pentoxide. Mixtures of the bases mentioned can also be used.

Preference is given to alkali metal alkoxides where alkali metal is in particular sodium or potassium and the alkoxide preferably derives from a secondary or tertiary alcohol. Particularly preferred strong bases are therefore for example sodium isopropoxide, potassium isopropoxide, sodium sec-butoxide, potassium sec-butoxide, sodium Cert-butoxide, potassium tert-butoxide, sodium tert-amoxide and potassium tert-amoxide. The alkali metal alkoxides can also be prepared in situ by reacting the appropriate alcohol with the alkali metal, alkali metal hydride or alkali metal amide.

To hydrolyze the pigment alkali metal salt, water or one or more organic protic solvents can be used as a hydrolyzing agent. Useful protic solvents include for example alcohols, preferably having 1 to 4 carbon atoms, such as methanol or ethanol. It is also possible to use water and alcohol in any desired combination. The hydrolysis can also be carried out in the presence of organic aprotic solvents. The hydrolysis can be accomplished directly by addition of a hydrolyzing agent to the reaction suspension, or indirectly, by addition of the reaction suspension to the hydrolyzing agent. The hydrolyzing agents water and organic protic solvent can be added and/or initially charged in any desired order and also as mixtures. Concurrent addition of individual components to an initial charge is also possible. It can be of advantage to use a buffer during the hydrolysis, for example a phosphate, acetate, citric acid or triethanolamine buffer.

The temperature at which the hydrolysis is carried out can be in the range from −20° C. to 200° C., preferably in the range from −5 to 180° C. and in particular in the range from 0 to 160° C., if necessary under superatmospheric pressure. The reaction suspension and the hydrolyzing agent can also have different temperatures. For example, the hydrolysis can also be accomplished by means of steam.

The total amount of hydrolyzing agent is advantageously an at least stoichiometric amount based on base. For example, water and/or an organic protic solvent can be used at between 0.5 and 50 parts by weight per 1 part of the pigment formed.

The mixed crystals of the present invention can subsequently also be finished without the crystal form changing. Depending on the conditions of the finish operation, the finely divided particles can grow again, so that the conditions of the finish operation have to be appropriately adjusted to the desired field of use. Finish conditions which lead to more opaque particles are known to one skilled in the art and are described in WO 02/085 987 for example.

Finish conditions which substantially preserve the fine state of subdivision achieved are described in EP-A-0 640 603 for example.

In a preferable procedure, the pigment suspension obtained in the hydrolysis of the pigment alkali metal salt is heated to a temperature of 50 to 150° C., in particular 80 to 130° C., if appropriate under superatmospheric pressure, for 0.1 to 8 hours, in particular 0.5 to 6 hours. The presence of surface-active agents which inhibit crystal growth can be advantageous.

Pigmentary dispersants, surface-active agents, defoamers, extenders or other admixtures can be added at any stage of the process to facilitate formation of mixed crystals, to stabilize the mixed crystals, to inhibit crystal growth, to improve the coloristic properties and/or to achieve defined coloristic effects, provided these added materials do not impair the advantages associated with the present invention. Mixtures of these added substances can also be used. The substances which are added can be added in one or more portions. The substances which are added can be added at every stage of the synthesis or the various aftertreatments, or after the aftertreatments. The most suitable point in time has to be determined beforehand by means of range-finding tests.

It is also possible for one or more of the recited operations for preparing the pigment compositions of the present invention to be carried out in a microreactor, for example as described in EP-A-1 257 602.

The mixed crystals of the present invention can in principle be used for pigmenting all macromolecular organic materials of natural or synthetic origin, for example plastics, resins, coatings, in particular metallic coatings, paints, printing inks, electrophotographic toners and developers, electret materials, color filters and also liquid inks, in particular inkjet inks.

Macromolecular organic materials which can be pigmented with the mixed crystals of the present invention are for example cellulose compounds, such as for example cellulose ethers and esters, such as ethylcellulose, nitrocellulose, cellulose acetates or cellulose butyrates, natural binders, such as for example fatty acids, fatty oils, resins and transformation products thereof, or synthetic resins, such as polycondensates, polyadducts, addition polymers and addition copolymers, such as for example aminoplasts, in particular urea- and melamine-formaldehyde resins, alkyd resins, acrylic resins, phenoplasts and phenolic resins, such as novolaks or resols, urea resins, polyvinyls, such as polyvinyl alcohols, polyvinyl acetals, polyvinyl acetates or polyvinyl ethers, polycarbonates, polyolefins, such as polystyrene, polyvinyl chloride, polyethylene or polypropylene, poly(meth)acrylates and addition copolymers thereof, such as polyacrylic esters or polyacrylonitriles, polyamides, polyesters, polyurethanes, coumarone-indene and hydrocarbon resins, epoxy resins, unsaturated synthetic resins (polyesters, acrylates) having different curing mechanisms, waxes, aldehyde and ketone resins, vulcanized rubber, unvulcanized rubber and its derivatives and latices, casein, silicones and silicone resins; individually or in mixtures.

It is immaterial here whether the macromolecular organic compounds mentioned are present as plastically deformable masses, melts or in the form of spinning solutions, dispersions, coatings, paints or printing inks. Depending on the intended use, it will be found to be advantageous to use the mixed crystals of the present invention as a blend or in the form of preparations or dispersions.

Based on the macromolecular organic material to be pigmented, the mixed crystals of the present invention are usually used in an amount of 0.01% to 30% by weight and preferably 0.1% to 20% by weight. Higher amounts may be used for the use in color filters, as mentioned below.

The mixed crystals of the present invention are also useful as colorants in electrophotographic toners and developers, for example one- or two-component powder toners (also called one- or two-component developers), magnetic toners, liquid toners, addition polymerization toners and also specialty toners. The mixed crystals of the present invention are also useful as colorants in aqueous and nonaqueous inkjet inks and also in such inks which function according to the hot-melt method.

More particularly, the pigment compositions of the present invention are useful as colorants for color filters not only for additive color production but also for subtractive color production, as for example in electro-optical systems such as television screens, liquid crystal displays (LCDs), charge coupled devices, plasma displays or electroluminescent displays, which in turn can be active (twisted nematic) or passive (supertwisted nematic) ferroelectric displays or light-emitting diodes, and also as colorants for "electronic inks", or "e-inks", or "electronic paper" ("e-paper").

To manufacture color filters, whether of the reflecting type or of the transparent type, pigments in the form of a paste or as pigmented photoresists in suitable binders (acrylates, acrylic esters, polyimides, polyvinyl alcohols, epoxies, polyesters, melamines, gelatin, caseins) are applied to the respective LCD components (for example TFT-LCD=Thin Film Transistor Liquid Crystal Displays or for example ((S)TN-LCD=(Super) Twisted Nematic-LCD). As well as high thermal stability, a high pigment purity is also a prerequisite, for a stable paste or for a pigmented photoresist.

In addition, the pigmented color filters can also be applied by inkjet printing processes or other suitable printing processes.

The red hues of the pigment compositions of the present invention are very particularly useful for the color filter color set of red-green-blue (RGB). These three colors are present side by side as separate dots of color which, when backlit, produce a full-color picture.

Typical colorants for the blue dot are phthalocyanine colorants or benzimidazolonedioxazine pigments such as for example C.I. Pigment Blue 15:6 or C.I. Pigment Blue 80. The green dot typically utilizes phthalocyanine colorants, for example C.I. Pigment Green 36 or C.I. Pigment Green 7.

If necessary, the respective color dots can each be admixed with further colors for shading. The red and green hues are preferably admixed with yellow, for example with C.I. Pigment Yellow 138, 139, 150, 151, 180 or 213. The blue hue is preferably admixed with violet, for example with C.I. Pigment Violet 19 or 23.

The concentration in which the pigment compositions of the present invention are used in the applied color filter film can be between 5% and 95% by weight, preferably between 20% and 80% by weight and most preferably between 40% and 60% by weight, based on the overall weight of the color filter film.

The present invention also provides a color filter comprising a coloristically effective amount of the pigment composition of the present invention.

It is finally also possible to process the mixed crystal pigment of the present invention by dry mixing with organic or inorganic masses, granules, fibers, powders and other pigments to obtain compositions of matter.

In the examples which follow, percentages and parts are by weight, unless otherwise stated. Mole percent are based on total nitrile. The x-ray powder diagrams were measured with Cu—$K_\alpha$ radiation, 2 theta values in degrees, measurement accuracy +/−0.2°, and the reported intensities mean: vs=very strong, s=strong, m=medium, w=weak.

Comparative Example 1

100% 4-Chlorobenzonitrile 31 parts of 4-chlorobenzonitrile are introduced into 30% sodium amylate (prepared from 9.3 parts of sodium and 143 parts of amyl alcohol) and heated to 100° C. 30 parts of diisopropyl succinate are added during two hours. After a further four hours at 100° C., the pigment alkali salt suspension is cooled down to 80° C. and poured onto hot water at 60° C. The pigment suspension is subsequently conditioned by heating to 95° C. for five hours, filtered off, washed with methanol and water and dried at 75° C. in a drying cabinet to obtain a yellowish red pigment which has the following characteristic lines in the x-ray powder diagram:

| 2 theta: | relative intensity: |
| --- | --- |
| 7.6 | m |
| 15.3 | m |
| 20.6 | w |
| 24.6 | m |
| 25.8 | m |
| 26.9 | w |
| 28.3 | s |
| 31.1 | m |
| 32.1 | m |
| 33.0 | w |

Comparative Example 2

100% 2-Chlorobenzonitrile

Comparative Example 1 is repeated using 2-chlorobenzonitrile instead of 4-chlorobenzonitrile.

The orange pigment obtained has the following characteristic lines in the x-ray powder diagram:

| 2 theta: | relative intensity: |
| --- | --- |
| 6.6 | s |
| 8.0 | m |
| 12.7 | m |
| 13.2 | w |
| 13.7 | w |
| 14.2 | m |
| 14.5 | m |
| 16.0 | w |
| 17.1 | m |
| 17.5 | w |
| 18.0 | w |
| 18.3 | w |
| 19.4 | m |
| 20.0 | w |
| 20.6 | s |
| 20.8 | m |
| 23.0 | w |
| 23.6 | w |
| 24.2 | m |
| 24.9 | s |
| 26.4 | w |
| 27.2 | w |
| 27.5 | w |
| 29.7 | m |
| 31.0 | w |
| 32.5 | w |
| 32.9 | w |

Example 1

Mixed Crystal Formed From 75 mol% of 2-Chlorobenzonitrile And 25 Mol % of 4-Chlorobenzonitrile Comparative Example 1 is repeated except that 23.25 parts of 2-chlorobenzonitrile and 7.75 parts of 4-chlorobenzonitrile are reacted.

The product is isolated and washed with methanol and water to obtain a ruby-colored pigment. It has the following characteristic lines in the x-ray powder diagram:

| 2 theta: | relative intensity: |
| --- | --- |
| 5.9 | s |
| 8.0 | w |
| 12.7 | w |
| 13.3 | m |
| 14.2 | w |
| 14.5 | w |
| 15.7 | w |
| 17.0 | w |
| 18.0 | w |
| 19.4 | w |
| 19.9 | w |
| 20.6 | m |
| 23.5 | w |
| 24.2 | m |
| 25.0 | m |
| 25.5 | m |
| 26.4 | s |
| 29.6 | w |

Example 2

Mixed Crystal Formed From 80 Mol % of 2-Chlorobenzonitrile And 20 Mol % of 4-Chlorobenzonitrile Comparative Example 1 is repeated except that 24.8 parts of 2-chlorobenzonitrile and 6.2 parts of 4-chlorobenzonitrile are reacted.

The product is isolated and washed with methanol and water to obtain a ruby-colored pigment. It has the following characteristic lines in the x-ray powder diagram:

| 2 theta: | relative intensity: |
| --- | --- |
| 6.0 | s |
| 8.0 | w |
| 12.7 | w |
| 13.3 | m |
| 14.2 | w |
| 14.5 | w |
| 15.8 | m |
| 17.1 | w |
| 18.1 | w |
| 19.4 | w |
| 20.1 | w |
| 20.6 | m |
| 23.6 | w |
| 24.2 | w |
| 24.9 | m |
| 25.6 | m |
| 26.4 | m |
| 29.6 | w |

Example 3

Mixed Crystal Formed From 70 mol % of 2-Chlorobenzonitrile And 30 Mol % of 4-Chlorobenzonitrile Comparative Example 1 is repeated except that 21.7 parts of 2-chlorobenzonitrile and 9.3 parts of 4-chlorobenzonitrile are reacted.

The product is isolated and washed with methanol and water to obtain a ruby-colored pigment. It has the following characteristic lines in the x-ray powder diagram:

| 2 theta: | relative intensity: |
|---|---|
| 5.9 | s |
| 7.9 | w |
| 12.7 | w |
| 13.3 | m |
| 14.2 | w |
| 14.5 | w |
| 15.8 | m |
| 17.0 | w |
| 17.9 | w |
| 19.8 | w |
| 20.6 | w |
| 24.2 | w |
| 25.0 | w |
| 25.6 | m |
| 26.4 | s |
| 28.9 | w |
| 29.6 | w |

Example 4

Mixed Crystal Formed From 50 Mol % of 2-Chlorobenzonitrile And 50 Mol % of 4-Chlorobenzonitrile Comparative Example 1 is repeated except that 15.5 parts of 2-chlorobenzonitrile and 15.5 parts of 4-chlorobenzonitrile are reacted.

The product is isolated and washed with methanol and water to obtain a ruby-colored pigment. It has the following characteristic lines in the x-ray powder diagram:

| 2 theta: | relative intensity: |
|---|---|
| 5.9 | s |
| 7.9 | w |
| 12.7 | w |
| 13.3 | m |
| 14.2 | w |
| 14.5 | w |
| 15.8 | m |
| 17.0 | w |
| 18.0 | w |
| 20.6 | w |
| 24.9 | m |
| 25.5 | m |
| 26.5 | s |
| 29.6 | w |

Example 5

Mixed Crystal Formed From 70 Mol % of 2-Chlorobenzonitrile And 30 Mol % of 4-Methylbenzonitrile Comparative Example 1 is repeated except that 21.7 parts of 2-chlorobenzonitrile and 7.9 parts of 4-methylbenzonitrile are reacted.

The product is isolated and washed with methanol and water to obtain a ruby-colored pigment. It has the following characteristic lines in the x-ray powder diagram:

| 2 theta: | relative intensity: |
|---|---|
| 5.8 | s |
| 12.7 | m |
| 13.6 | m |
| 14.1 | m |
| 14.6 | m |
| 15.9 | m |
| 20.7 | m |
| 23.5 | w |
| 24.1 | w |
| 24.9 | w |
| 25.4 | m |
| 26.6 | m |

Example 6

Mixed Crystal Formed From 70 Mol % of 2-Chlorobenzonitrile And 30 Mol % of 4-Cyanobenzonitrile Comparative Example 1 is repeated except that 21.7 parts of 2-chlorobenzonitrile and 8.6 parts of 4-cyanobenzonitrile are reacted.

The product is isolated and washed with methanol and water to obtain a ruby-colored pigment. It has the following characteristic lines in the x-ray powder diagram:

| 2 theta: | relative intensity: |
|---|---|
| 6.1 | s |
| 12.7 | m |
| 13.6 | m |
| 14.0 | m |
| 14.6 | m |
| 16.0 | w |
| 20.2 | w |
| 20.6 | w |
| 24.2 | w |
| 25.0 | m |
| 25.4 | m |
| 26.4 | m |

We claim:

1. A mixed crystal comprising compounds of formula (I), (II) and (III),

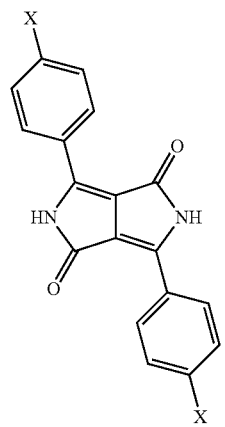

-continued

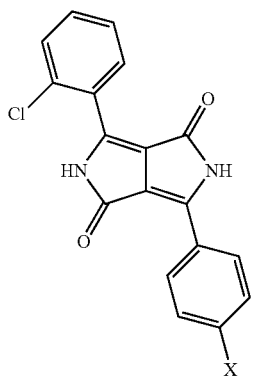
(II)

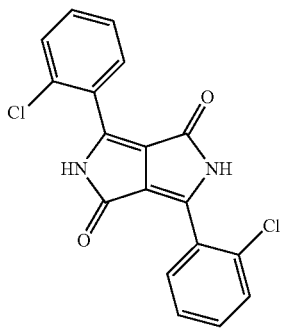
(III)

obtained by reacting 1 mol of a succinic diester with 2 mol of a mixture of nitriles A-CN and B—CN, in a molar ratio of 90:10 to 30:70 between the A-CN and B—CN in the mixture of nitriles, A-CN being 2-chlorobenzonitrile and B—CN being 4-X-benzonitrile where X=chlorine, methyl or nitrile.

2. The mixed crystal as claimed in claim 1, obtained by reacting 1 mol of a succinic diester with 2 mol of the mixture of nitriles A-CN and B—CN in a molar ratio of 80:20 to 40:60 between the A-CN and B—CN in the mixture of nitrites.

3. The mixed crystal as claimed in claim 1 obtained by reacting 1 mol of a succinic diester with 2 mol of a mixture of nitriles A-CN and B—CN in a molar ratio of 75:25 to 50:50 between the A-CN and B—CN in the mixture of nitrites.

4. The mixed crystal as claimed in claim 1, wherein X is chlorine.

5. The mixed crystal as claimed in claim 1, wherein the main signals in the x-ray powder diagram

| 2 theta: | relative intensity: |
|---|---|
| 5.9 | S |
| 13.4 | M |
| 15.8 | M |
| 25.5 | M |
| 26.5 | M | wherein the x-ray powder diagram is Cu—$K_\alpha$ radiation, 2 theta values in degrees, measuring accuracy +/−0.2° intensities: s=strong, m=medium.

6. A process for preparing a mixed crystal as claimed claim 1 comprising the step of reacting 1 mol of a succinic diester with 2 mol of the mixture of nitriles A-CN and B—CN in a molar ratio of 90:10 to 30:70 between the A-CN and B—CN in the mixture of nitriles, in an organic solvent, in the presence of a strong base and at elevated temperature to form a pigment alkali salt, hydrolysis of the pigment alkali salt in water, alcohol or both to obtain the mixed crystal and optionally solvent finishing.

7. A pigmented macromolecular organic material of natural or synthetic origin pigmented by a mixed crystal as claimed in claim 1.

8. The macromolecular material of natural or synthetic origin as claimed in claimed 7, wherein the macromolecular material of natural or synthetic origin is selected from the group consisting of plastics, resins, coatings, paints, printing inks, electrophotographic toners, electrophotographic developers, color filters and liquid inks.

9. A pigmented color filter, metallic coating or inkjet ink pigmented by a mixed crystal as claimed in claim 1.

* * * * *